(12) United States Patent
Esmailzadeh et al.

(10) Patent No.: US 10,671,760 B2
(45) Date of Patent: Jun. 2, 2020

(54) SECURE AND PRIVATE DATA STORAGE

(71) Applicant: Arash Esmailzadeh, Los Angeles, CA (US)

(72) Inventors: Arash Esmailzadeh, Los Angeles, CA (US); Andrew Vogan, Dayton, VA (US)

(73) Assignee: Arash Esmailzadeh, Los Angeles, CA (US)

( * ) Notice: Subject to any disclaimer, the term of this patent is extended or adjusted under 35 U.S.C. 154(b) by 136 days.

(21) Appl. No.: 15/056,593

(22) Filed: Feb. 29, 2016

(65) Prior Publication Data
US 2016/0253521 A1 Sep. 1, 2016

Related U.S. Application Data

(60) Provisional application No. 62/126,099, filed on Feb. 27, 2015.

(51) Int. Cl.
  *G06F 21/62* (2013.01)
  *H04L 29/06* (2006.01)
  *G06F 21/60* (2013.01)

(52) U.S. Cl.
  CPC ........ *G06F 21/6263* (2013.01); *G06F 21/602* (2013.01); *G06F 21/604* (2013.01); *G06F 21/6245* (2013.01); *H04L 63/10* (2013.01); *H04L 63/308* (2013.01); *G06F 2221/2107* (2013.01)

(58) Field of Classification Search
  CPC ..... H04L 63/10; H04L 63/308; G06F 21/604; G06F 21/6263
  See application file for complete search history.

(56) References Cited

U.S. PATENT DOCUMENTS

| 8,166,406 | B1* | 4/2012 | Goldfeder | G06F 21/6263 |
| | | | | 709/224 |
| 8,776,169 | B2* | 7/2014 | Rajagopal | G06F 21/36 |
| | | | | 726/1 |
| 8,793,509 | B1* | 7/2014 | Nelson | G06F 21/335 |
| | | | | 380/227 |
| 8,881,227 | B2* | 11/2014 | Rajagopal | H04L 63/08 |
| | | | | 726/1 |

(Continued)

OTHER PUBLICATIONS

Fredrikson, Matthew; Livshits, Benjamin; "REPRIV: Re-Imagining Content Personalization and In-Browser Privacy", Symposium on Security and Privacy, IEEE, May 22-25, 2011, pp. 131-146.*

(Continued)

*Primary Examiner* — Victor Lesniewski
(74) *Attorney, Agent, or Firm* — Kilpatrick Townsend & Stockton LLP

(57) ABSTRACT

A method of securely authorizing limited access by a software application to private user data may include operating a software application that can utilize user data, sending a request to a first server to authorize release of the user data, receiving an authorization from the first server to release the user data, and sending a request to retrieve the user data to a plurality of second servers. The method may also include receiving a portion of the user data from each of the plurality of second servers, assembling the user data from at least two of the portions of the user data, and providing the user data to the software application.

20 Claims, 13 Drawing Sheets

(56) References Cited

U.S. PATENT DOCUMENTS

| | | | |
|---|---|---|---|
| 9,137,319 B2* | 9/2015 | Xu | G06F 21/6263 |
| 9,258,136 B2* | 2/2016 | Verschoor | G06F 21/53 |
| 2004/0043758 A1* | 3/2004 | Sorvari | G06F 17/30884 |
| | | | 455/414.1 |
| 2009/0106561 A1* | 4/2009 | Ejiri | G06F 21/62 |
| | | | 713/193 |
| 2010/0274910 A1* | 10/2010 | Ghanaie-Sichanie | |
| | | | H04L 9/3234 |
| | | | 709/229 |
| 2011/0289565 A1* | 11/2011 | Resch | H04L 9/085 |
| | | | 726/5 |
| 2012/0023547 A1* | 1/2012 | Maxson | G06F 21/6245 |
| | | | 726/1 |
| 2012/0240237 A1* | 9/2012 | Kanevsky | G06F 16/957 |
| | | | 726/26 |
| 2012/0304286 A1* | 11/2012 | Croll | G06F 21/6263 |
| | | | 726/22 |
| 2013/0054803 A1* | 2/2013 | Shepard | H04L 63/0884 |
| | | | 709/225 |
| 2013/0238900 A1* | 9/2013 | Leggette | H04L 63/0428 |
| | | | 713/165 |
| 2013/0268357 A1* | 10/2013 | Heath | H04L 63/00 |
| | | | 705/14.53 |
| 2013/0325823 A1* | 12/2013 | Resch | G06F 17/3023 |
| | | | 707/695 |
| 2013/0340028 A1* | 12/2013 | Rajagopal | H04L 63/08 |
| | | | 726/1 |
| 2013/0340086 A1* | 12/2013 | Blom | G06F 21/6245 |
| | | | 726/26 |
| 2014/0214919 A1* | 7/2014 | Taylor | H04L 67/2814 |
| | | | 709/203 |
| 2014/0282852 A1* | 9/2014 | Vestevich | G06F 21/6263 |
| | | | 726/1 |
| 2014/0297635 A1* | 10/2014 | Orduna | H04L 63/10 |
| | | | 707/736 |
| 2014/0351891 A1* | 11/2014 | Grube | G06F 11/0727 |
| | | | 726/3 |
| 2015/0082455 A1* | 3/2015 | Jalili | G06F 21/6263 |
| | | | 726/27 |
| 2015/0088777 A1* | 3/2015 | Chauhan | G06Q 30/01 |
| | | | 705/325 |
| 2016/0092699 A1* | 3/2016 | Riva | H04L 67/306 |
| | | | 726/26 |
| 2016/0148006 A1* | 5/2016 | Ganapathi | G06F 21/62 |
| | | | 726/30 |

OTHER PUBLICATIONS

Weinberg, Zachary; Chen, Eric Y.; Jayaraman, Pavithra Ramesh; Jackson, Collin; "I Still Know What You Visited Last Summer: Leaking browsing history via user interaction and side channel attacks", Symposium on Security and Privacy, IEEE, May 22-25, 2011, pp. 147-161.*

* cited by examiner

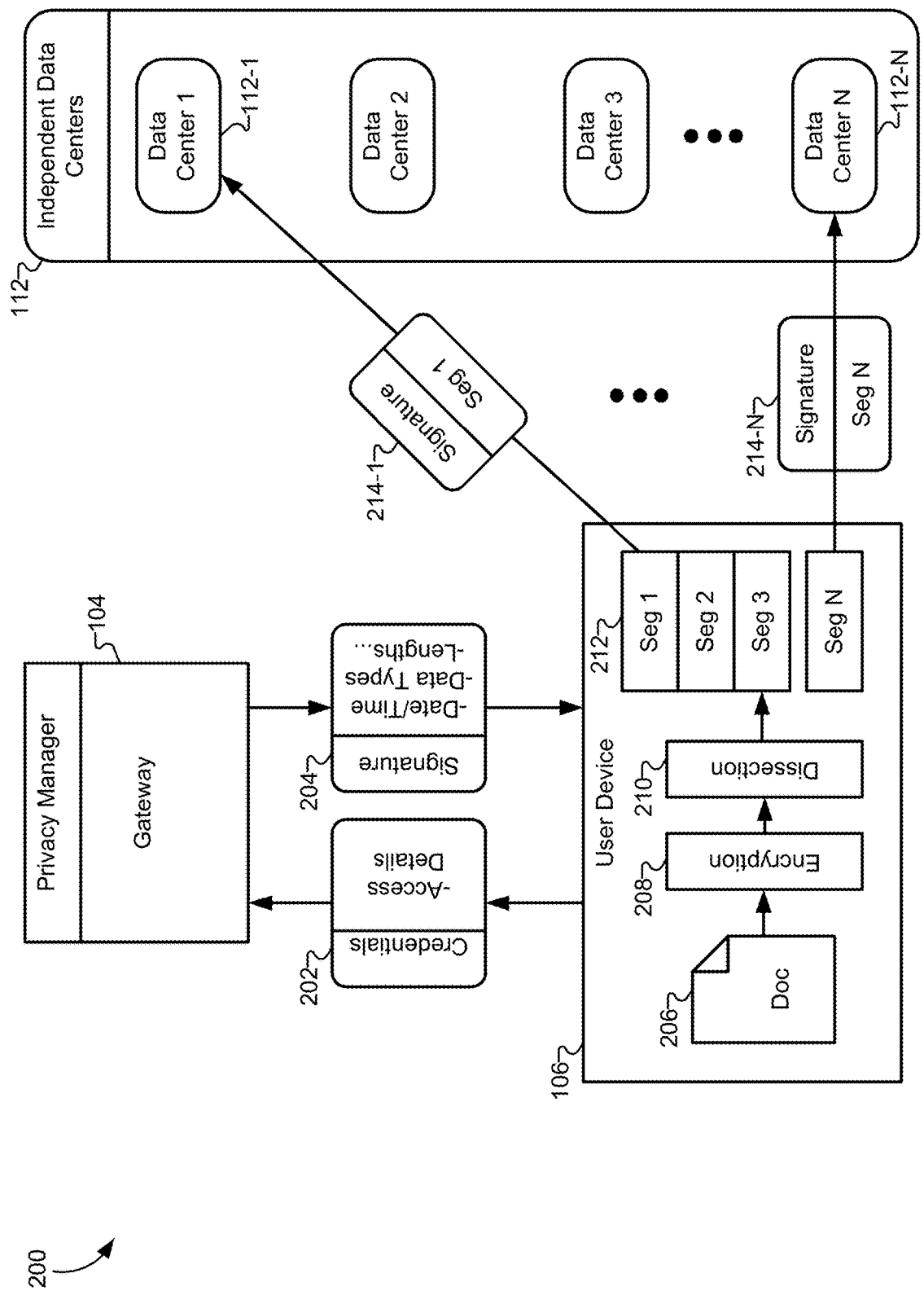

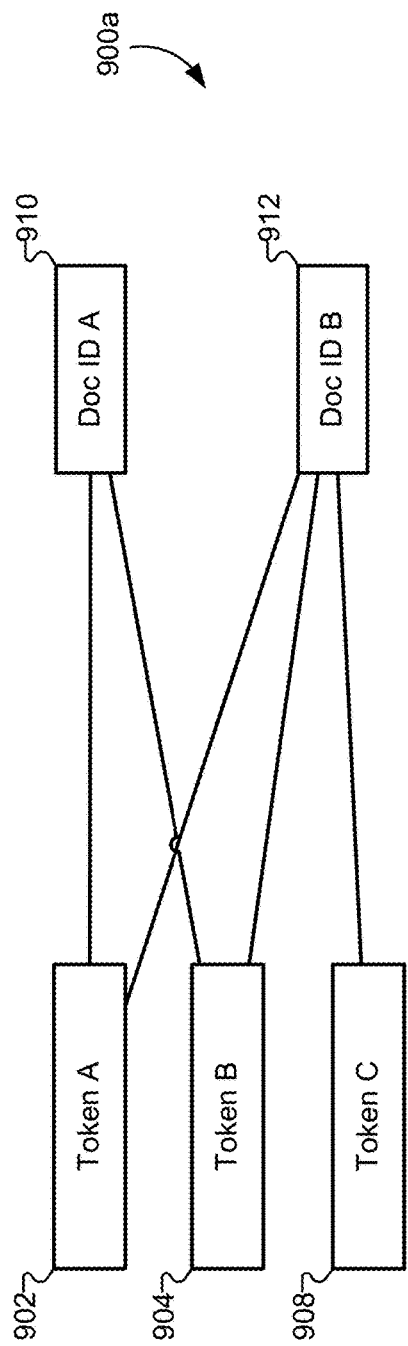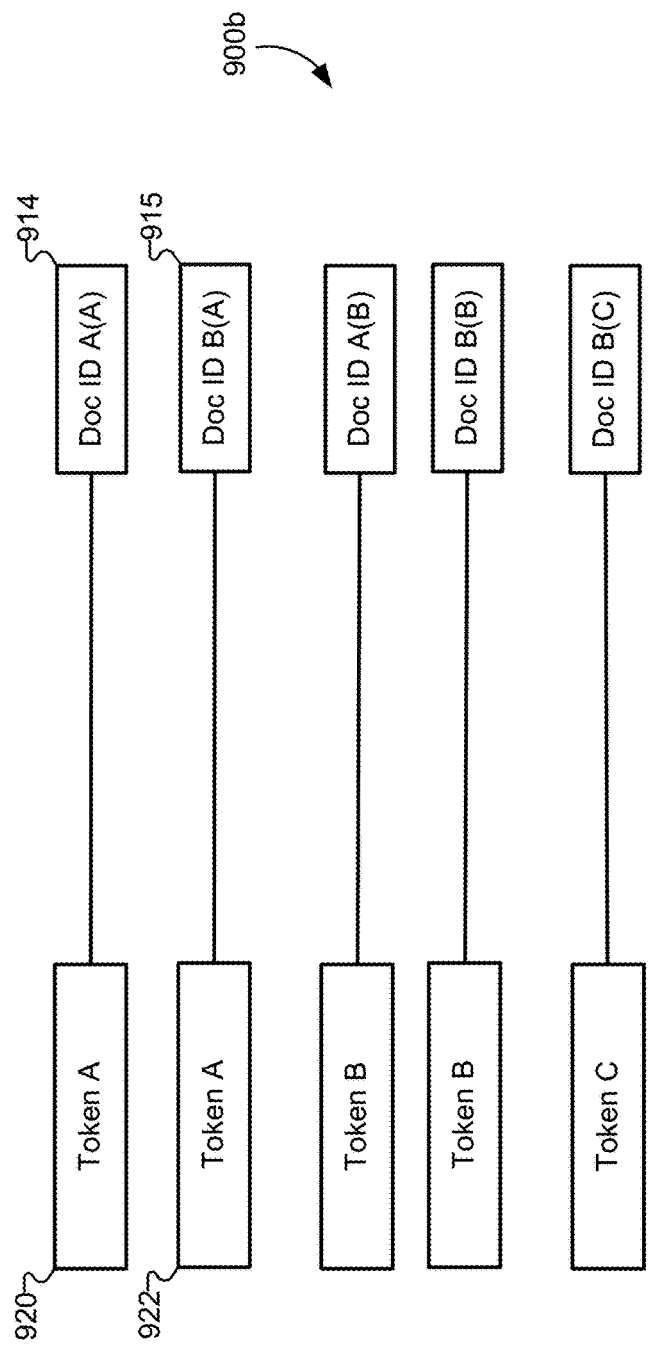

SECURE AND PRIVATE DATA STORAGE

CROSS-REFERENCES TO RELATED APPLICATIONS

This application claims the benefit of U.S. Provisional Patent Application No. 62/126,099 filed on Feb. 27, 2015 entitled SECURE AND PRIVATE DATA STORAGE. U.S. Provisional Patent Application No. 62/126,099 is hereby incorporated herein by reference in its entirety, including the appendices.

BACKGROUND

The explosive adoption of Internet technologies over the past 20 years is proof enough of how tremendously we value the connectivity the Internet provides. But as online service providers expand their channels of productivity, convenience, and entertainment, their clients' online footprints inevitably grow larger as well. Unlike actual footprints, however, those digital footprints can morph into fingerprints, leaving Internet users wondering about how deeply their privacy has been compromised by their online activities. Whether it's online retailers tracking shopping behavior, data brokers scooping up and selling profile information that has leaked through social media, or the GPS trail so many smart phone users leave as they move about, consumers and businesses alike have every reason to be concerned about the percolation and collection of their private information through the Internet.

These concerns will only grow—probably exponentially—as service providers inexorably seek to realize the competitive edge that big data analytics promises. For example, life insurance companies are using the big data aggregated in records of applicants' online behavior to gauge life expectancy. After one online reservation broker discovered that the average Mac® user spends more on hotels than the typical PC user, it began steering the Mac® users toward pricier lodgings. Breaches of users' privacy such as these, regardless of whether the damage involved was more imagined or real, spark real recriminations against the providers who minimize the value that users place on privacy.

Between 2009 and 2013, the percentage of Internet users who said they worry about the availability of information about them online them rose from 33% to 50%, according to the Pew Research Center. Pew also reported that nearly 90% of the people they surveyed have tried at least one way, such as clearing tracking cookies or their browser history, to prevent online tracking, and almost 70% said that the law is not doing enough to protect their privacy. As for identity theft, 2013 marked the 14th consecutive year in which that crime was the number-one consumer complaint in the United States, according the Federal Trade Commission.

Even if most users' concerns over Internet privacy are primarily a matter of principle, for victims of crime and political dissidents it can be a matter of life or death. For whistleblowers, it can be a matter of continuing to earn a living. And for businesses, it can be a matter of relying on the Internet to communicate trade secrets. The demand for online privacy has been with us since the 1990s, and it will continue to grow as our dependence on the Internet, and the data sets accessible through it, grows.

BRIEF SUMMARY

In some embodiments, a method of securely authorizing limited access by a software application to private user data may include operating a software application that can utilize user data, sending a request to a first server to authorize release of the user data, receiving an authorization from the first server to release the user data, and sending a request to retrieve the user data to a plurality of second servers. Each second server in the plurality of second servers may be independent from the first server. Each second server in the plurality of second servers may be independent from each of the other second servers in the plurality of second servers. The method may also include receiving a portion of the user data from each of the plurality of second servers, assembling the user data from at least two of the portions of the user data, and providing the user data to the software application.

In some embodiments, a non-transitory computer-readable medium may be presented. The computer-readable memory may comprise a sequence of instructions which, when executed by one or more processors, causes the one or more processors to perform operations including operating a software application that can utilize user data, sending a request to a first server to authorize release of the user data, receiving an authorization from the first server to release the user data, and sending a request to retrieve the user data to a plurality of second servers. Each second server in the plurality of second servers may be independent from the first server. Each second server in the plurality of second servers may be independent from each of the other second servers in the plurality of second servers. The operations may also include receiving a portion of the user data from each of the plurality of second servers, assembling the user data from at least two of the portions of the user data, and providing the user data to the software application.

In some embodiments, a system may be presented. The system may include one or more processors and one or more memory devices. The one or more memory devices may comprise instructions that, when executed by the one or more processors, cause the one or more processors to perform operations including operating a software application that can utilize user data, sending a request to a first server to authorize release of the user data, receiving an authorization from the first server to release the user data, and sending a request to retrieve the user data to a plurality of second servers. Each second server in the plurality of second servers may be independent from the first server. Each second server in the plurality of second servers may be independent from each of the other second servers in the plurality of second servers. The operations may also include receiving a portion of the user data from each of the plurality of second servers, assembling the user data from at least two of the portions of the user data, and providing the user data to the software application.

In any of the embodiments described herein, one or more of the following features may be implemented in any combination and without limitation. The method/operations may also include receiving updated user data from the software application, dissecting the updated user data into a plurality of data portions, and sending a data portion from the plurality of data portions to each of the plurality of second servers. The method/operations may also include sending a request to the first server to authorize storage of the updated user data comprising a size of the updated user data, and receiving an authorization from the first server to store the updated user data in the plurality of second servers. The method/operations may also include sending the authorization from the first server to each of the plurality of second servers along with the request to retrieve the user data. The software application may include a search engine interface operating in a web browser on the computing device. The user data may include a search engine history. The software application may include an email client. The user data may include a document index. The method/operations may also include receiving an encrypted set of keys from the plurality of second servers, and decrypting the encrypted set of keys, where the encrypted set of keys may be encrypted using a hash of a stored password. The method/operations may also include parsing a document to extract a set of tokens to populate the document index by identifying tokens that distinguish the document from other documents, associating each token in the set of tokens with a document identifier, encrypting each token in the set of tokens using the set of keys, dissecting each encrypted token into a plurality of token portions, and sending each token person to a different one of the plurality of second servers. The first server may include a gateway of a privacy management system. The method/operations may also include displaying a user interface control comprising a plurality of privacy settings, where the plurality of privacy setting may include a first setting that restricts the software application from accessing the user data, a second setting that limits the software application to accessing the user data during a current active session, and a third setting that allows the software application to access the user data. A setting selected by the user interface control may be specific to the software application, and other settings selected by the user interface may be specific to other software applications.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 2 illustrates a simplified block diagram of a process for encrypting, dissecting, and storing information on a plurality of independent data centers, according to some embodiments.

FIGS. 9A-9B illustrate a diagrams of a third method for enhancing the security of a stored index, according to some embodiments.

DETAILED DESCRIPTION

Figure 1A:
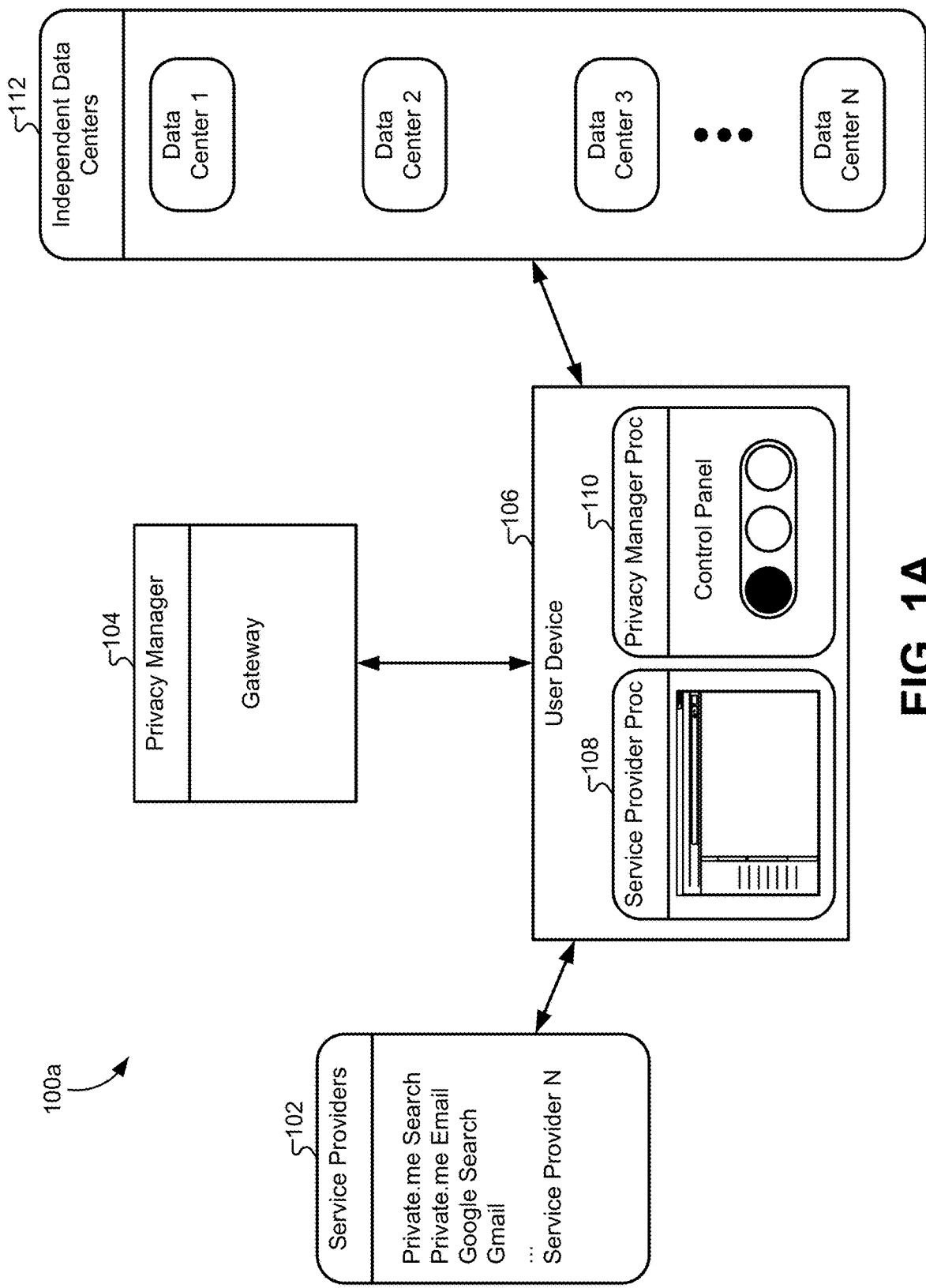
FIG. 1A illustrates a simplified block diagram of a system for securely governing access to user data, according to some embodiments.

Described herein, are embodiments for securely storing and granting access to personal user data. Service providers, such as search engines, email servers, commercial retailers, and so forth, are prevented from storing user information permanently on their sites. Instead, users interact with a privacy manager gateway to manage storage of their personal information. The user device may include a user interface that allows for fine-grained control over access to the user data. At the user device, a software application can collect the user data, encrypt the user data, and dissect the user data into a plurality of data portions. The plurality of data portions can then be sent to separate, distinct, and independent data storage nodes. When the service providers need access to the user data, plug-ins or other software applications operating on the user device can retrieve the plurality of data portions from the data storage nodes, reassemble the user data, and temporarily provide the user data to the service provider. In addition to storing user information, the privacy management system described herein can securely tokenize and index documents such as email correspondence, search histories, and so forth. Decryption keys can be securely stored only on the user device, and the dispersed data storage paradigm eliminates single points-of-failure that are out of the user's control. Additionally, email can be securely transmitted by maintaining a secure set of public/private key pairs on user devices and distributed amongst the data storage nodes.

Given the importance that Internet users give to online privacy, it hardly comes as a surprise that the market of technologies designed to protect that privacy has grown. For online search, users have been turning to alternatives such as DuckDuckGo®, which collects no information on its users and blocks ad trackers. The more tech-savvy consumer may opt for Internet anonymizers and proxy servers to keep their online activities out of the view of prying eyes.

Despite the unmet demand for online privacy and the opportunity that this demand has created, the most popular methods currently available to defeat the tracking of one's online activity come at the price of losing valuable historic information, which actually can be handy for many users. With no search history, users have no way of recalling previous searches that proved to be useful. These methods also hobble the artificial-intelligence capabilities of advanced search engines, preventing them from learning how to most rapidly and reliably find the sites most relevant to the user. Some users may want to maintain both their privacy and a point of reference that they can turn to and use. They may want to retain their shopping behavior to receive personalized coupons, or keep search terms to receive more relevant advertisements.

While Internet users are justifiably concerned about online privacy, none of the most widely used consumer technologies today actually give users control over their information. DuckDuckGo® may not record search behavior, but some consumers want a record of their online activity, as noted just above. Moreover, they want authority over that record. They have a sense of ownership regarding their online history. They feel that it rightfully belongs to them, and that they should be the ones to exert control over it in a secure and private environment. People are hesitant to use technology in new and innovative ways because of privacy and security concerns, specifically for electronic health records and online banking.

Facebook®, Google®, and other service providers offer their users some control over the information they collect—for example, by allowing the users to block specific trackers—but even when users choose to deploy all the privacy protection that the providers offer, the providers still store their users' private information on privately owned, centrally networked servers, and maintain 24/7 access to it. Consequently, all that information remains vulnerable to the threat of, for example, a disaffected employee releasing users' information, or to hackers tunneling their way into those servers and then violating the users' privacy in myriad ways.

The problem is that the reigning model of online privacy is the "Fort Knox" paradigm, in which a wall of ever-more complex security measures stands between a centralized vault of valuable data and those who would use that data without authorization. Individuals who can penetrate that wall can use that data according to whatever inclinations they may have.

The embodiments described herein solve these and other problems by not requiring "circling the encryption wagons" around a monolithic digital encampment. Instead, user information, such as online behavior, can be encrypted and divided into multiple packets that are then dispersed across several networks of geographically distributed storage nodes owned not by the service providers, but rather by entities that have a legal disincentive to profit from the data. Each user is granted exclusive control over access to his/her data, so that a provider is only able to view it and use it only when permitted by the user, such as only when the user is online and using that service. At all other times, the provider would "forget" their clients' private data after it had arrived at the secure, geographically distributed nodes. In terms of online privacy, this scenario is not merely innovative. It completely overturns the paradigm of provider as "protector" of the user's personal data.

In some embodiments, nonprofit organizations, such as mutual benefit corporations, under the laws of California may operate independent storage nodes. The bylaws of such corporations can be written to forbid them from sharing, either among themselves or with third parties, certain information that is stored on their servers, unless authorized by the owners of that information. Additionally, it can be illegal for them to sell their assets, including their servers that contain users' information, to a for-profit entity. A method of maintaining online privacy is known as the Dispersed Storage System (DSS). It uses sophisticated algorithms to encrypt with AES-256 keys, fragment the data, and then distribute the fragments to geographically distributed storage nodes on a series of dispersed networks. No complete copy of the original data exists on any single node anywhere in the networks.

Encrypted, fragmented, distributed across multiple networks, and with access controlled by clients rather than their service providers, the DSS-protected data is nothing but useless bits to everybody but the user. No disgruntled employee of a provider could sell user information to a third party. No provider bankruptcy or merger would pose a threat to users' privacy. To access a user's information, one would, in effect, have to break into multiple "Fort Knoxes."

FIG. 1A illustrates a simplified block diagram 100a of a system for securely governing access to user data, according to some embodiments. The system may include a user device 106, which may include any user computing device, such as a laptop computer, a desktop computer, a smart phone, a tablet device, a PDA, a smart appliance, and so forth. The user device 106 may include a software application operating thereon that is provided by a service provider 102. As used herein, the term "service provider" may include cloud-based services, Software-as-a-Service (SaaS) providers, web services, search engines, email providers, and stand-alone applications running on the user device 106. In many instances, the service provider 102 will include a server-side component as well as a client-side component. The client-side component may include a service provider process 108 that operates in a web browser or as a stand-alone application on the user device 106. The user device 106 can be distinguished from the service provider 102 in that the "user" of the user device 106 may be a client, customer, or user of the service provider 102. For example, the service provider 102 may include the Google® search engine, and the user device 106 may include a laptop computer operated by someone using the Google® search engine.

The user device 106 may also include a privacy manager process 110 that interfaces with the service provider process 108 to govern access to user information. The privacy manager process 110 may be part of a privacy manager architecture that includes the privacy manager process 110 operating locally on the user device 106 as well as a privacy manager gateway 104 discussed in greater detail below. The privacy manager process 110 may be provided by an entity that operates the privacy manager gateway 104, and may be downloaded from an online app store or other online code repository. The privacy manager process 110 may operate as a stand-alone application, as a plug-in for a web browser, as a background process, as a mobile app, and so forth. For example, the privacy manager process 110 may operate as a web browser plug-in that provides the ability to modify and experience on third-party web sites—such as Gmail—and to ensure that private data never exist in plaintext on any single server outside of the user device 106. The splitting and joining of data for dispersal may take place in the privacy manager process 110 as described below, rather than on any device other than the user device 106.

The privacy manager, or privacy manager system, can be distinguished from the user device 106 and from the service provider 102 in that the "user" of the user device 106 is a customer of the privacy manager system. A user may subscribe to the privacy service provided by the privacy manager system in order to govern access to the user's personal data as the user interfaces with the service provider. The service provider 102, the user device 106, and a privacy manager gateway 104 may each be owned, operated, and governed by separate and distinct legal entities.

The privacy manager gateway 104 may maintain credentials required to access a plurality of independent data centers 112. The user device 106 may first authenticate with the privacy manager gateway 104 in order to verify that the privacy manager system should allow the user device 106 to access data in the independent data centers 112. For example, the privacy manager gateway 104 may verify a user name, password, and/or other credential types provided by the user device 106 to authenticate a user identity. The privacy manager gateway 104 may also verify various account options, such as whether the user has paid their bills, whether suspicious behavior is been detected, and whether an amount of data to be stored by the user device 106 on the plurality of independent data centers 112 exceeds a predetermined threshold, such as a disk quota paid for by a customer. Once the privacy manager gateway 104 has authenticated the identity and authorization level, it provides the user device 106 with credentials necessary to complete the transaction with the independent data centers 112. Alternatively, some embodiments may instead allow the privacy manager gateway 104 to send the credentials directly to the independent data centers 112 without requiring the credentials to pass through the user device 106.

As described above, the independent data centers 112 may receive portions of encrypted and fragmented personal data that have been encrypted and dissected by the privacy manager process 110 operating on the user device 106. Each of the independent data centers 112 may reside in a geographically separate location separated by at least one mile. Each independent data center 112 may operate on an independent and separate network. In some embodiments, each of the independent data centers 112 may be owned/operated by separate and distinct organizations or legal entities, such as nonprofit organizations. Because of this organization, in the unlikely event that hackers gain access to even several of the independent data centers 112, and succeeded in downloading and decrypting information belonging to a user, they would still only have fragmented information that would be of little value.

Figure 1B:
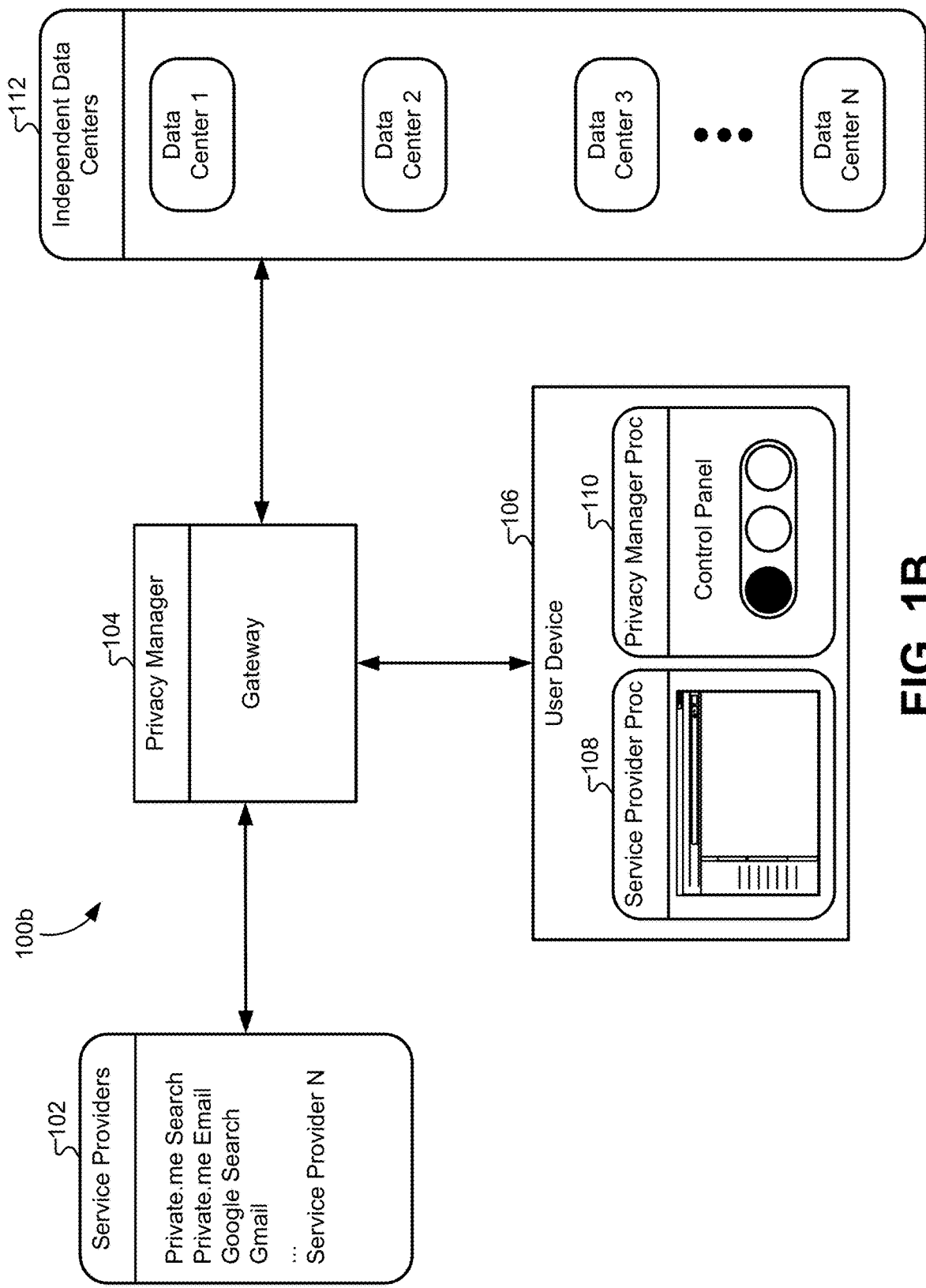
FIG. 1B illustrates a simplified block diagram of an alternative system for securely governing access to user data, according to some embodiments.

FIG. 1B illustrates a simplified block diagram 100b of an alternative system for securely governing access to user data, according to some embodiments. Block diagram 100b is similar to block diagram 100a, the difference being that the service provider 102 is able to communicate directly through the privacy manager gateway 104 instead of communicating through the user device 106. This architecture allows the service provider 102 to authenticate with the privacy manager gateway 104, then directly access the independent data centers 112 to retrieve the user data. The privacy manager process 110 on the user device 106 can still govern access to the user data on the independent data centers 112. The user device 106 is able to dynamically determine what level of access the service provider 102 is allowed to have at any given moment. This architecture allows the service provider 102 to have access to the user data when the user device 106 is off-line.

FIG. 2 illustrates a simplified block diagram 200 of a process for encrypting, dissecting, and storing information on a plurality of independent data centers 112, according to some embodiments. To securely store the user data, or document 206, the user device 106 sends a request 202 to the privacy manager gateway 104. The request 202 may include a set of credentials used to authenticate the identity of a user of the user device 106. The request 202 may also include details of how the user device 106 will access the independent data centers 112. For example, the request 202 may include a type of data being stored, an amount of data to be stored, an identity of the service provider, and so forth. The privacy manager gateway 104 can analyze the request 202 and determine whether the user device 106 should be allowed to access the independent data centers 112 as specified in the request 202. This operation may include determining whether a user account is associated with the user device 106, determining whether the credentials can be properly authenticated, determining whether a data type or operation type is part of a service purchased by a customer associated with the user device 106, and so forth.

If the request can be approved, the privacy manager gateway 104 may send a response 204 to the user device 106. The response 204 may include a signature that verifies that the operations requested in the request 202 have been approved by the privacy manager gateway 104. The response 204 may include information originally found in the request 202, such as data types/lengths. The response 204 may also include session information, expiration times, time intervals during which the transaction will be allowed, specific servers in the plurality of independent data centers 112 that may be accessed, and so forth.

When the request to access the independent data centers 112 is approved by the privacy manager gateway 104, the user device 106 can next encrypt, dissect, and send the document 206 to the independent data centers 112. In some embodiments, establishing an account with the privacy manager system may cause a secret key to be generated/stored on the user device 106, designated herein as "Key1." Key1 may only exist on the user device 106 and may be inaccessible by both the privacy manager gateway 104 and any of the independent data centers 112. An encryption process 208 may use Key1 to encrypt the entire plaintext of the document 206.

Next, a dissection process 210 can be used to split the ciphertext provided by the encryption process 208 into a plurality of data portions 212. Various algorithms may be used by the dissection process 210. For example, some embodiments may use one of the many variants of Shamir's Secret Sharing algorithm (k, n) which divides the ciphertext into n portions, where at least k of the n portions are required to reconstruct the data. This ensures that the dissected data remains secure provided that fewer than k of the n independent data centers 112 are compromised. This also allows (n–k) data centers to fail before losing the user data. These algorithms represent a trade-off between data security and data availability. In some embodiments, the dissection algorithm may include randomized data being inserted during various stages of the dissection process to generate the plurality of data portions 212. In some embodiments, the number of data portions 212 that are produced may be determined by a number of the independent data centers 112 that are available to the user device 106. For example, some service levels may allow the data portions 212 to be stored on a greater number of the independent data centers 112, according to a user account preferences or paid-for services.

After encrypting and dissecting the document 206, the plurality of data portions 212 may each be sent to individual ones of the independent data centers 112. In some embodiments, each transmission 214 may include at least one of the data portions 212 and some form of the signature provided in the response 204 from the privacy manager gateway 104. When the independent data centers 112 receive the data portions 212, they can verify that the signature information has authorized the operation. For example, the independent data centers may verify the signature using keys provided from the privacy manager gateway 104. If more data is transmitted than was authorized, if the user's account is out of date or unpaid, if the data type or service provider does not match the signature information, if the transmissions 214 occur outside of a designated time window, or if any other criteria specified by the signature information is unmet, the independent data centers 112 can reject the transmissions 214. In cases where the data portions 212 fit within the criteria established by the signature information, the independent data centers 112 can store the data portions securely.

In order to retrieve the document 106 from the independent data centers 112, the reverse process described above may be followed. Specifically, the user device 106 can send the request 202 to the privacy manager gateway 104 specifying the type and amount of information to be retrieved. The privacy manager gateway 104 can provide a response 204 with a signature authorizing retrieval of the information. The user device 106 can then send signature information along with a request to the independent data centers 112, and receive in return the plurality of data portions 212. Using an inverse dissection algorithm 210, such as a known inverse of Shamir's Secret Sharing algorithm, the user device 106 can reassemble the ciphertext and decrypt the document 206 using Key1. The document 206 can then be provided to a service provider.

Figure 3:
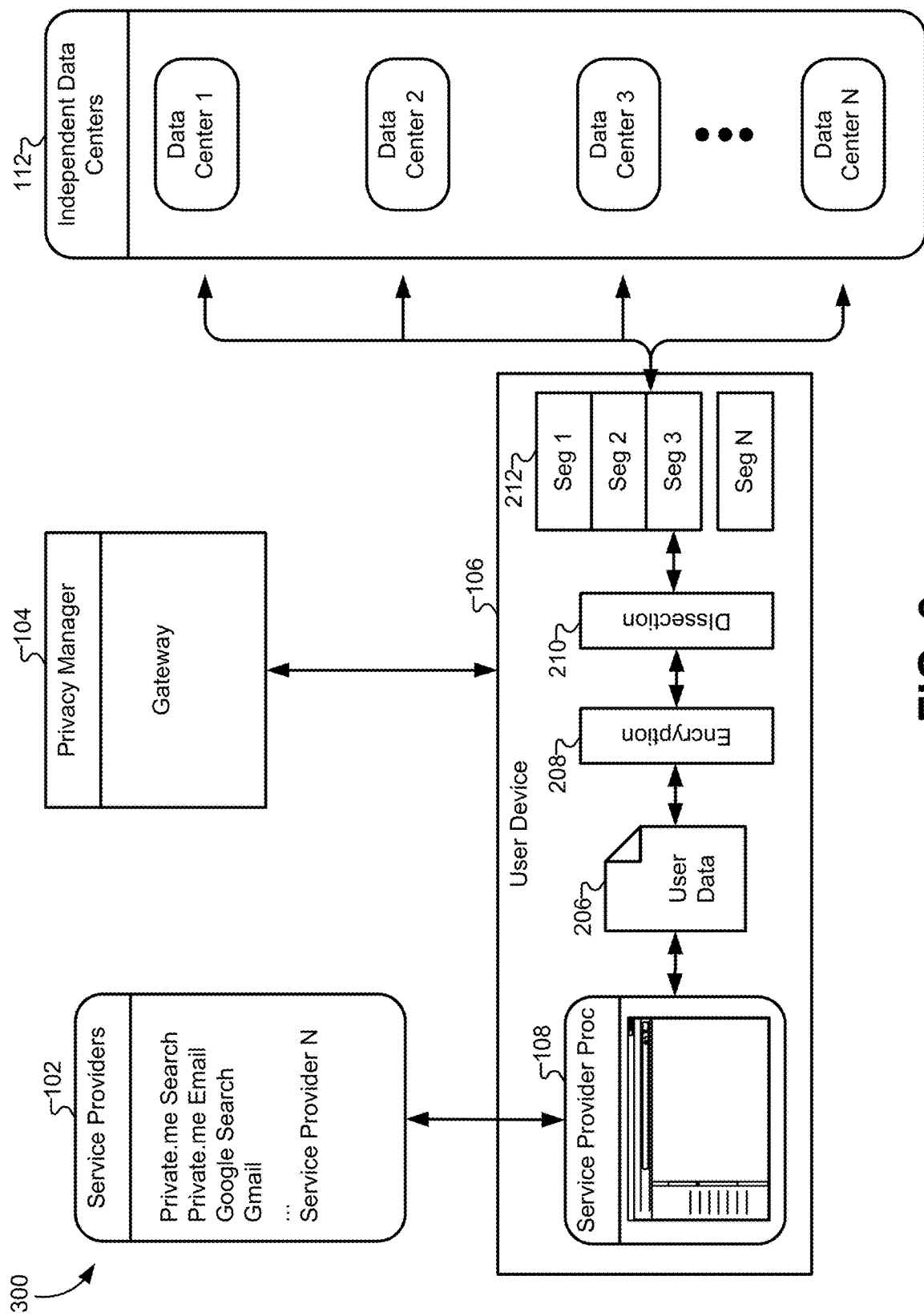
FIG. 3 illustrates a block diagram for interfacing with a service provider, according to some embodiments.

FIG. 3 illustrates a block diagram for interfacing with a service provider 102, according to some embodiments. This embodiment may be used for retrieving user data from a service provider 102 and/or providing user data to a service provider 102. In one exemplary embodiment, the service provider may include a search engine. A user search history and/or search preferences may be represented in block diagram 200 as the document 206. The document 206 may be provided to the search engine in order to allow the user to browse their search history inside the traditional web interface. The document 206 may be also provided from the web browser after a number of searches have been performed.

In some embodiments, the user data will never leave the user device 106. The data is provided to the service provider process 108, such as a client-side search browser interface, and is deleted as soon as the session with the service provider process 108 is finished. For example, when the user closes their web browser, the search history may be removed from the browser cache and deleted. The search history can then be encrypted, dissected, and uploaded to the independent data centers 112 by the privacy manager process operating as a browser plug-in. This entire process can take place in a manner that is transparent to the user. When the user opens their web browser, their search history may be fully available while maintaining absolute security and control over that search history.

In some embodiments, the user data in document 206 may be allowed to be transmitted to the service provider 202 in limited circumstances. In these cases, the service provider 102 must verify that the user data is deleted from their systems as determined by the settings provided by the privacy manager process. Note that in these cases, the service provider 102 still does not have access to Key1 in order to decrypt the user data. The service provider 102 also may not have access to the independent data centers 112.

Figure 4:
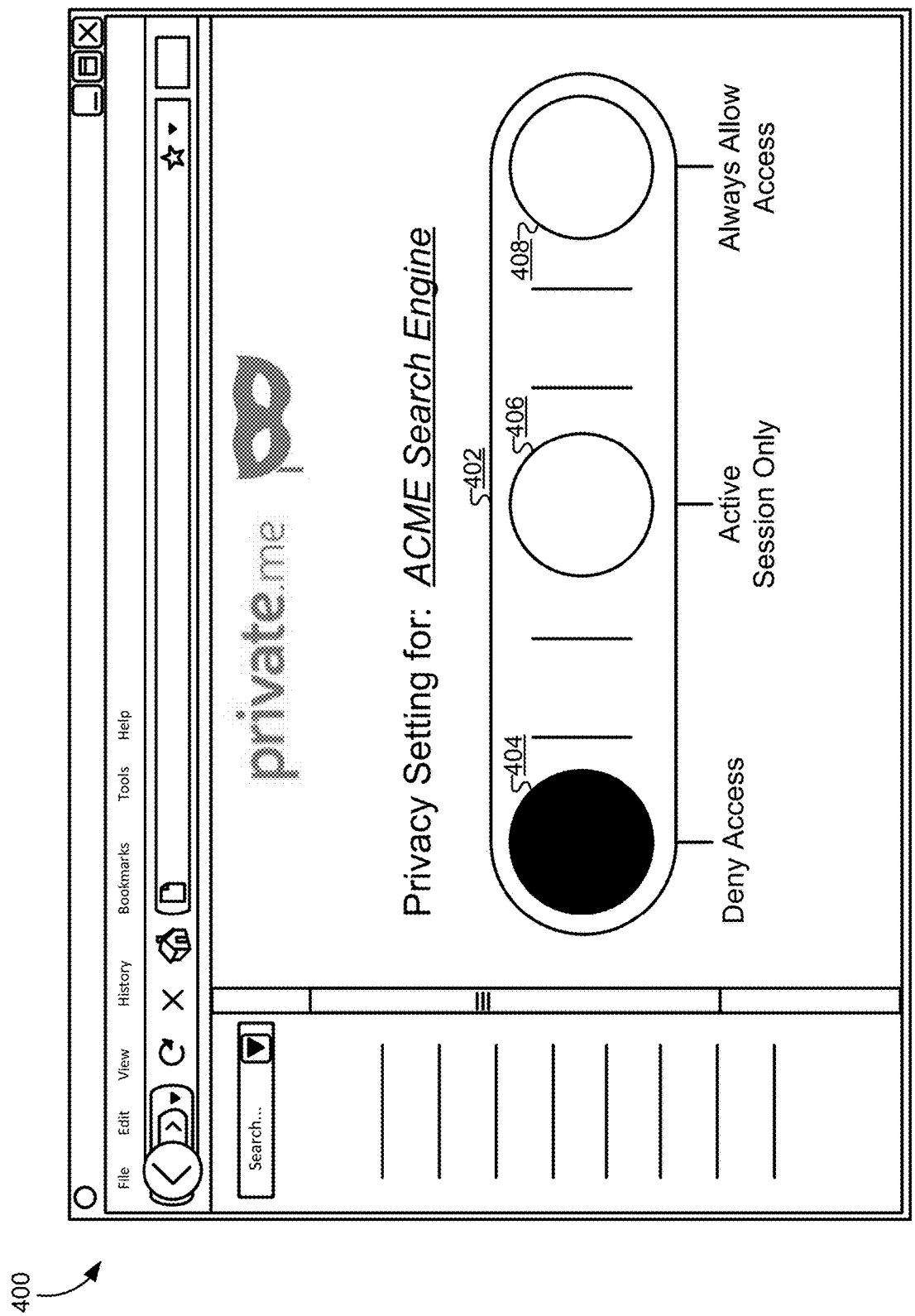
FIG. 4 illustrates a control in a user interface for the privacy manager process, according to some embodiments.

FIG. 4 illustrates a control 402 in a user interface 400 for the privacy manager process, according to some embodiments. The control 402 includes a horizontal slider that allows a user to position the control indicator in a plurality of different positions. The embodiment illustrated in FIG. 4 shows at least three positions 404, 406, 408, and allows the user to set an access level for a particular service provider. It will be understood that the control 402 is merely exemplary and not meant to be limiting. The control 402 could take many other forms other than the horizontal slider depicted in FIG. 4. For example, the control may also include a vertical slider, a drop-down list, a set of radio buttons, a set of checkboxes, and so forth. Although the control 402 of FIG. 4 shows three distinct settings, other embodiments may include additional settings.

In this embodiment, the control 402 includes three different settings, or access levels, that may be granted to the particular service provider, in this case the "ACME Search Engine." A first setting 404 can allow the user to deny access entirely to the service provider. For example, this would force a search engine to operate without any access to a user search history. In some embodiments, the first setting 404 may allow the service provider to store a copy of the user data (e.g. search history) on a server of the service provider for a limited time. A second setting 408 can allow the user to grant full access to the service provider. For example, this would allow a search engine to have complete access to a user's search history, and possibly to add to that search history from the current session. A third setting 406 can allow the user to grant access to the service provider while keeping certain restrictions in place. For example, the third setting 406 may allow a search provider to have access to research history during an active session with a client-side search interface. Once the session is over, the privacy manager system will cause the search history to be deleted from the web browser cache, then encrypt, dissect, and send the search history to the independent data centers as described above.

Figure 5:
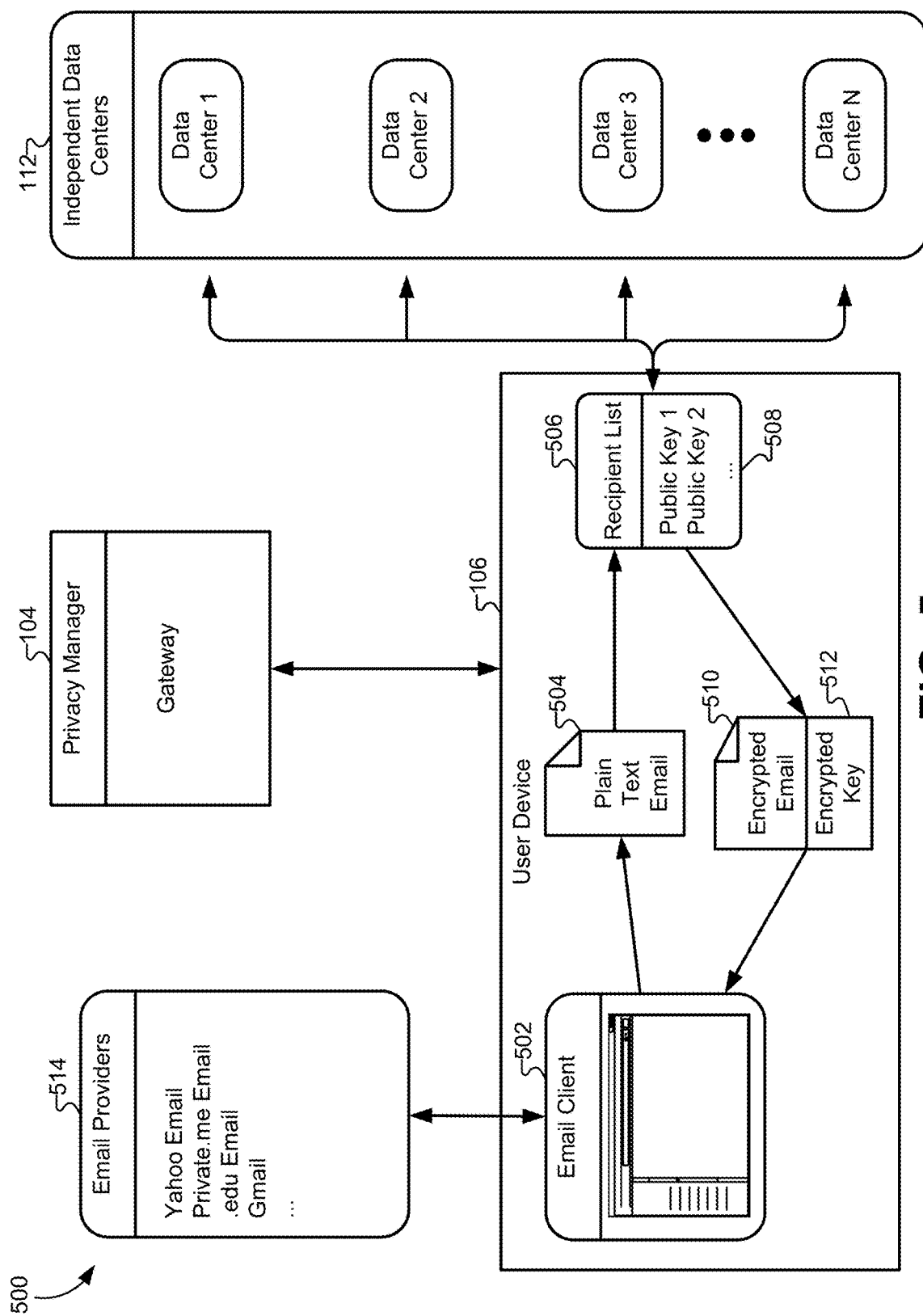
FIG. 5 illustrates a block diagram for interfacing with an email provider, according to some embodiments.

FIG. 5 illustrates a block diagram for interfacing with an email provider 514, according to some embodiments. In contrast to other service providers, such as search engines, an email provider 514 must store at least some form of user data away from the user device 106 because the email provider 514 is responsible for transmitting email messages between users. However, instead of allowing the emails to exist in the email client in plaintext, the privacy manager system can instead encrypt any email message or attachment before it is sent to a recipient. The keys used to transmit an email can be stored and/or protected by the independent data centers 112 such that they are not available to the email provider 514.

In some embodiments, an email client 502 may operate in a web browser on the user device 106. This is often the case with commercial email providers, such as Gmail®, Yahoo Mail®, Hotmail®, and so forth. The privacy manager process may operate as a plug-in on the web browser that appears to allow the email client to operate as normal but performs encryption of email documents in the background. The browser plug-in can acquire user credentials and login with the privacy manager gateway 104 when a session with the email provider 514 begins. In other embodiments, the privacy manager process may instead operate as a complete email client that uses protocol such as POP3, SMTP, IMAP, and/or EXCHANGE, to interface with a server-side email provider 514.

Once a user has composed an email message 504 in the email client and clicks "Send," the privacy manager process can intercept the plain text of the email message 504 before it is sent to the email provider 514. This activates the privacy features of the privacy manager system rather than simply allowing the email to be transmitted in plaintext. First, the privacy manager process may examine the email message 504 and extract a recipient list 506. The recipient list 506 is then sent to the independent data centers 112. Public keys 508 for the individual recipients on the recipient list 506 may be stored on the independent data centers 112. In some embodiments, the public keys 508 may be encrypted/dissected as described above, such that only an encrypted portion of each key resides on any one of the independent data centers 112 at any time.

The privacy manager process can receive the public keys 508, or encrypted public key portions from the independent data centers 112, and reassemble/decrypt the public keys 508. Accordingly, the public keys 508 may not necessarily be truly "public" in these embodiments, as they are stored in an encrypted/dissected fashion on the independent data centers 112. However, they are still referred to as "public" in order to identify their role in a public/private encryption key pair.

A secret key can then be accessed or generated by the privacy manager process and used to encrypt the email message 504. The privacy manager process can then encrypt the secret key using the public keys 508 for each recipient. For example, the privacy manager process may produce an encrypted email 510 and a set of encrypted keys 512 for transmission by the email client 502. The set of encrypted keys 512 may include multiple encrypted versions of the secret key used to encrypt the encrypted email 510, each of which has been encrypted using one of the public keys 508 corresponding to a member of the recipient list 506. In some embodiments, the secret key used to encrypt the encrypted email 510 may be newly generated for each email, and may comprise a random symmetric (e.g., AES 256) encryption key of maximum length. This secret key can be used to generate the encrypted email 510 in a PGP-like format. The body of the email message 504 may be encrypted using the secret key, and the list of encrypted copies of the secret key, each encrypted using the public key of a recipient, can be attached to the cricket email 510. In some embodiments, dummy copies of the encrypted key can also be included to conceal the number of email recipients or the existence of any CC/BCC recipients. In some embodiments, the encrypted copies of the secret key may be salted.

In order to receive an email that has been encrypted by the privacy management system, the email client 102 can retrieve an encrypted email from the server-side service provider 102 to be delivered to a particular recipient. The recipient, operating the user device 106, can click to open the email, and the privacy manager process can intercept the encrypted email delivered by the service provider 102. The privacy manager process can scan the list of encrypted keys 512, and attempt to decrypt each key. The decryption algorithm can use a private key that corresponds to the public key stored in the independent data centers 112 for that particular recipient. For example, on an email with 10 recipients, the single private key stored on the user device 106 will correctly decrypt only one of the 10 encrypted keys. Having successfully decrypted at least one of the encrypted copies of the secret key used to encrypt the email message 504, the browser plug-in can then decrypt the encrypted email 510 using the decrypted secret key and allow the user to read the pain text of the email message 506 through the email client 502. In some embodiments, the browser plug-in can perform this operation transparently such that encrypted emails are displayed in the email client 502 without the user ever seeing any encrypted text.

For the system described above to work, each recipient of the email message 504 in the recipient list 506 must have an account, or at least a stored public key with the privacy manager system. In this way, the privacy manager system acts as a sort of private certificate authority, distributing public keys for users that are authenticated with the service. However, users may also wish to distribute the email message 504 to recipients that are not registered with the privacy manager system. In order to send messages outside of the privacy manager system, the following process may be used.

For a recipient that is not a subscriber to the privacy manager system, a public/private key pair can be allocated for the recipient to enable secure email communications with subscribers of the privacy manager system. The independent data centers 112 act as custodians of the private key until the non-subscriber recipient subscribes to manage their own private/public key pair. When an encrypted email is sent to a non-subscriber recipient, the browser plug-in can insert a button or link in the body of the email that redirects the recipient to a secure reader site provided by the privacy manager gateway 104. The secure reader site can perform email ownership validation and store cookies/tokens to that effect. The private keys needed to decrypt the secret key for decrypting the email can be sent from the independent data centers 112 to the privacy manager gateway 104 such that the secure reader site can decrypt the email for the user. Alternatively, the secure reader site can prompt the user to subscribe to the privacy manager service in order to decrypt the email. After subscribing, the private keys can be transferred to the new subscriber's user device in order to decrypt the email using the browser plug-in.

In some embodiments, encrypted emails can be made more secure by providing an expiration function. For example, the browser plug-in can create a new encryption key ("Key2") that can be used to encrypt the encrypted email 510 and/or the encrypted keys 512. Key2 can then be saved to the independent data centers 112 as a lookup value based on a generated unique ID of the email message, the recipient email address, and/or the identity of the sender/receiver. When a recipient receives the email, the browser plug-in can authenticate with the privacy manager gateway 104 and retrieve Key2 from the independent data centers 112 in order to decrypt the message. Note that this decryption takes place in addition to decrypting using the private key and secret key as described above. In order to expire an email, the sender can include an expiration time or valid time window when providing Key2 to the independent data centers 112. Once Key2 is no longer available from the independent data centers 112 due to expiration, the recipients will be unable to read the encrypted email 510.

Figure 6:
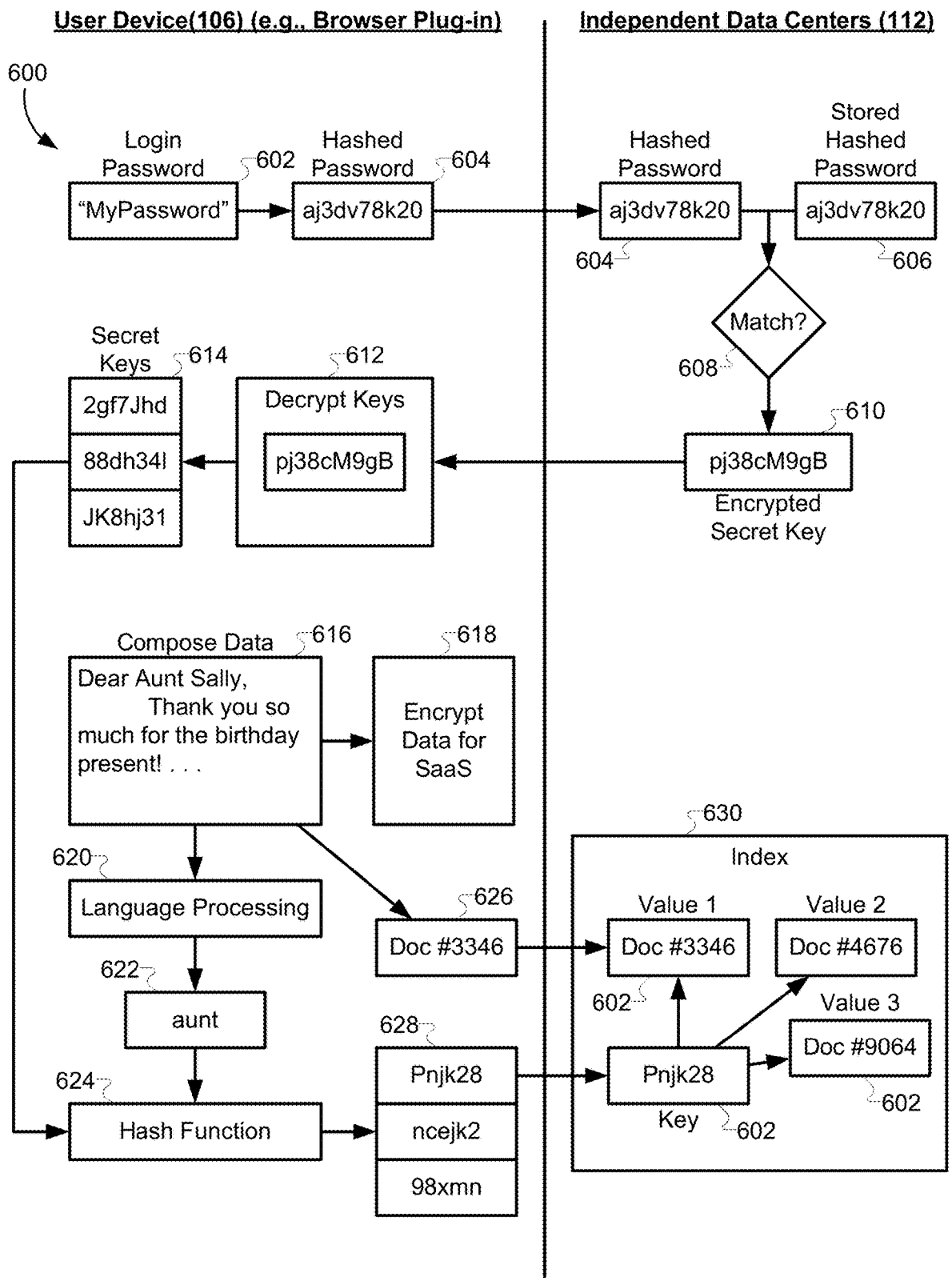
FIG. 6 illustrates a simplified flow diagram of a process for securely indexing data, according to some embodiments.

FIG. 6 illustrates a simplified flow diagram 600 of a process for securely indexing data, according to some embodiments. Indexing systems represent a unique vulnerability for user data. For user data to be readily usable, it needs to be searchable, which means that the user data needs to be indexed for use with a search engine. However, an index of user data also represents a prime target for malicious actors, in that they can easily sift through gigabytes of user data to find one or two pieces of compromising information very quickly. Therefore, the privacy manager system described above not only encrypts/dissects/stores user data and documents themselves, but can also securely generate and store an index for user data.

Before indexing a specific document, the client device can authenticate with the distributed data centers in order to temporarily retrieve a set of encrypted secret keys used to generate a secure index. A password 602 or other credential can be hashed at the user device 106, and the hashed password 604 can be sent to each of the independent data centers 112. The hashed password can be compared to a stored version of the hashed password 606 at the independent data centers 112, and if the hashed passwords match (608), then a set of encrypted secret keys 610 can be sent to the user device 106. In some embodiments, the set of encrypted secret keys 610 may be encrypted using the password 602 provided by the user device 106. The user device 106 can use a decryption process 612 to decrypt the set of encrypted secret keys 610 to generate a set of secret keys 614 used for encoding index entries. Note that each of the set of secret keys 614 can be received from a unique one of the independent data centers 112. Therefore, each of the secret keys 614 or correspond to a unique independent data center.

In this particular example, an email message 616 is used. However, the email message 616 is merely exemplary and not meant to be limiting. This indexing operation can be performed on any type of data or document, including structured data, unstructured data, search histories, text documents, software code, and/or the like.

A block of data, such as an email message 616 can be composed in a web browser or other software application operating on user device 106. As described above, the email message 616 can be encrypted 618 and sent to the email provider. Alternatively, data can also be encrypted, dissected, and stored at the independent data centers 112. In order to index data, such as the email message 616, a language processing tool 620 can parse the email message 616 to extract meaningful tokens that would be useful in an index. In some embodiments, the language processing tool 620 can remove common words, such as "and", "the", "it", and so forth, that would be common to almost every email message. The language processing tool 620 can identify proper nouns, words and phrases that are greater than a threshold length, and/or words and phrases that appear below a threshold amount of times in a corpus of email messages. The language processing tool 620 can also force each word into a canonical format, removing suffixes, pluralizations, and other modifiers. For example, the language processing tool 620 can identify the word "Aunt" in the email message 616 and store the token 622 "aunt" as an entry in the index. As used herein, the term "token" may refer to words, phrases, and/or symbols that are extracted from a text corpus and stored in a canonical form for the index.

In order to securely store index entries, a hash function 624 can accept a token 622 and encrypt the token 622 with each of the secret keys 614 received from the independent data centers 112. This operation will yield a set of encrypted tokens 628 corresponding to each of the independent data centers 112. The encrypted tokens 628 can be sent to each of the corresponding independent data centers 112 along with a document ID 626 identifying the email message 616. The independent data centers 112 can then generate an index 630 for each received encrypted token. The set of secret keys 614 can then be deleted from the user device 106.

When the user device needs to query the index, a process similar to that described above may be used. Again, the user device 106 may authenticate with the independent data centers 112 and receive the set of secret keys 614. A search function may accept a string of search text and extract a set of canonical tokens from the search function to submit to the index. Each token can then be encrypted using the set of secret keys and sent to the independent data centers 112. The independent data centers can then return document IDs corresponding to a set of search results. Depending on the particular embodiment, the document IDs can then be used to retrieve documents from the independent data centers 112 and/or to retrieve documents from the service provider (e.g., an email provider) that can be decrypted using keys retrieved from the independent data centers 112.

Some sophisticated hackers may be able to access the index in the independent data centers 112, generate a reverse index, and thereby put together at least a partial listing of encrypted text used in a particular document. While this would not reveal the entire document, at least a portion of the tokens used in the document may be susceptible to a brute force attack. In some embodiments, this can be thwarted by dissecting each entry in the index into encrypted data portions and storing the portions on the independent data centers 112 in the same way that documents are dissected and stored. In these embodiments, the index does not exist in a complete form on any single computing system.

Figure 7:
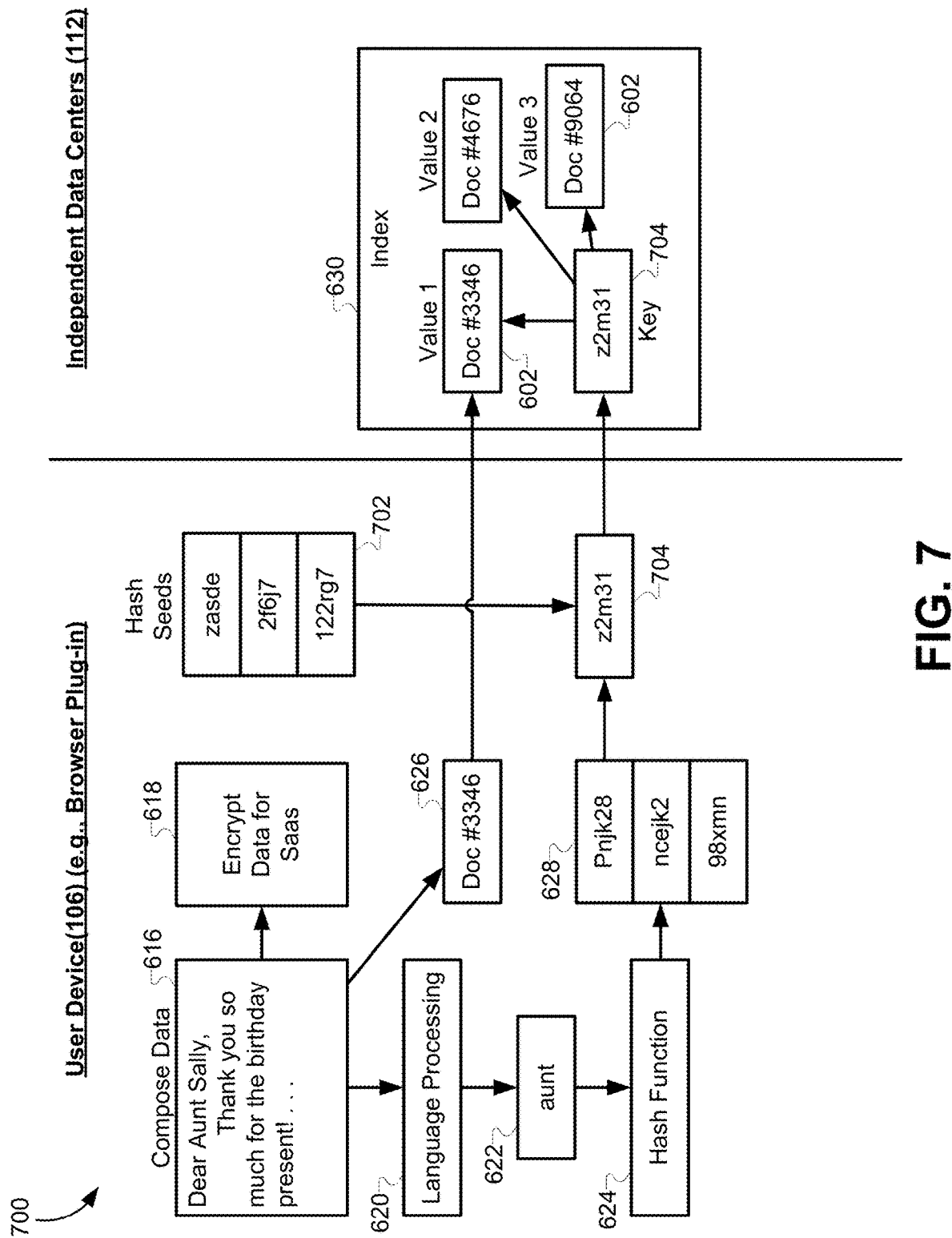
FIG. 7 illustrates a simplified flow diagram of a method for enhancing the security of a stored index, according to some embodiments.

FIG. 7 illustrates a simplified flow diagram 700 of a method for enhancing the security of a stored index, according to some embodiments. Instead of simply encrypting the tokens using a single secret key, the user device 106 can store a plurality of hash seeds 702. For each token, one of the plurality of hash seeds 702 can be selected at random and used to again encrypt the token 622 to generate a double-encrypted token 704. The practical effect of this operation is to randomly dilute the index with multiple values for each token. When querying the index, the user device 106 can encrypt the token 622 with each of the plurality of hash seeds 702 and sent each of the double-encrypted tokens 704 to the index. The independent data centers 112 can then return all document IDs matching any one of the double-encrypted tokens. Only the user device 106 knows which double-encrypted tokens actually map to the same token 622.

Figure 8:
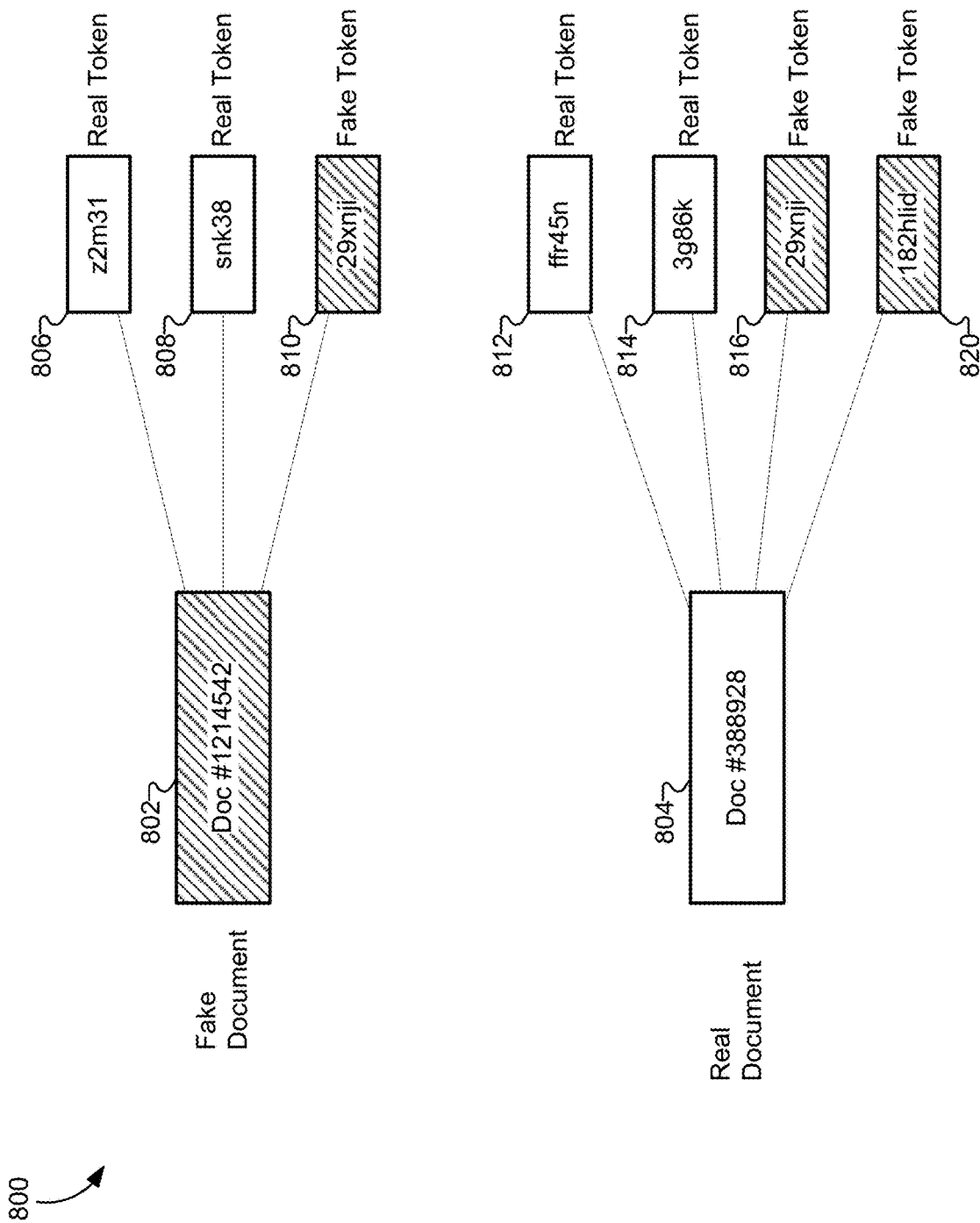
FIG. 8 illustrates a diagram of a second method for enhancing the security of a stored index, according to some embodiments.

FIG. 8 illustrates a diagram 800 of a second method for enhancing the security of a stored index, according to some embodiments. In addition to encrypting each token with one of a set of possible hash seeds, "noise" can be injected into the index. For example, fake tokens can be injected into the index. Because the fake tokens can be alphanumeric combinations that never appear in actual documents, they are tokens that would never be searched in the index. Therefore, adding fake tokens would not corrupt the search results returned by the index. For example, token 816 and token 820 corresponding to document 104 in reverse index of FIG. 8 would include index entries in the actual index for these fake tokens. The fake tokens could be added to a document as it is being indexed by the user device 106, or the fake tokens could be added by the independent data centers 112.

Additionally, entire fake documents could be created and used to add noise to the index. A fake document could include real terms 806, 808 appearing in real documents, as well as fake terms 810 originating in fake documents. The user device 106 can maintain a list of fake email IDs that should be disregarded from a set of search results. Adding fake tokens and/or adding fake documents adds noise to any document reconstruction that might take place by compromising a single one of the independent data centers 112 to the point where the document reconstruction would not produce meaningful results for a hacker.

FIGS. 9A-9B illustrate a diagrams 900a and 900b of a third method for enhancing the security of a stored index, according to some embodiments. This method for further securing the index obscures the document IDs that are transmitted with each token. FIG. 9A illustrates tokens 902, 904, 908 that are links to various document IDs 910, 912. Because documents can share tokens, there is a "many-to-many" relationship between the group of tokens of the group of document IDs. However, FIG. 9B uses a unique identifier for each instance of a document ID that is encoded using the token itself. Therefore, each search term will be paired with a unique document ID. For example, when token 920 is submitted with a link to document 914, this will appear to be a different document to the index than when the same document 916 is submitted with token 922. While this will add an extra processing and storage burden to the index and/or the user device, it eliminates all possibility of hackers using a reverse index technique to assemble an email.

Figure 10:
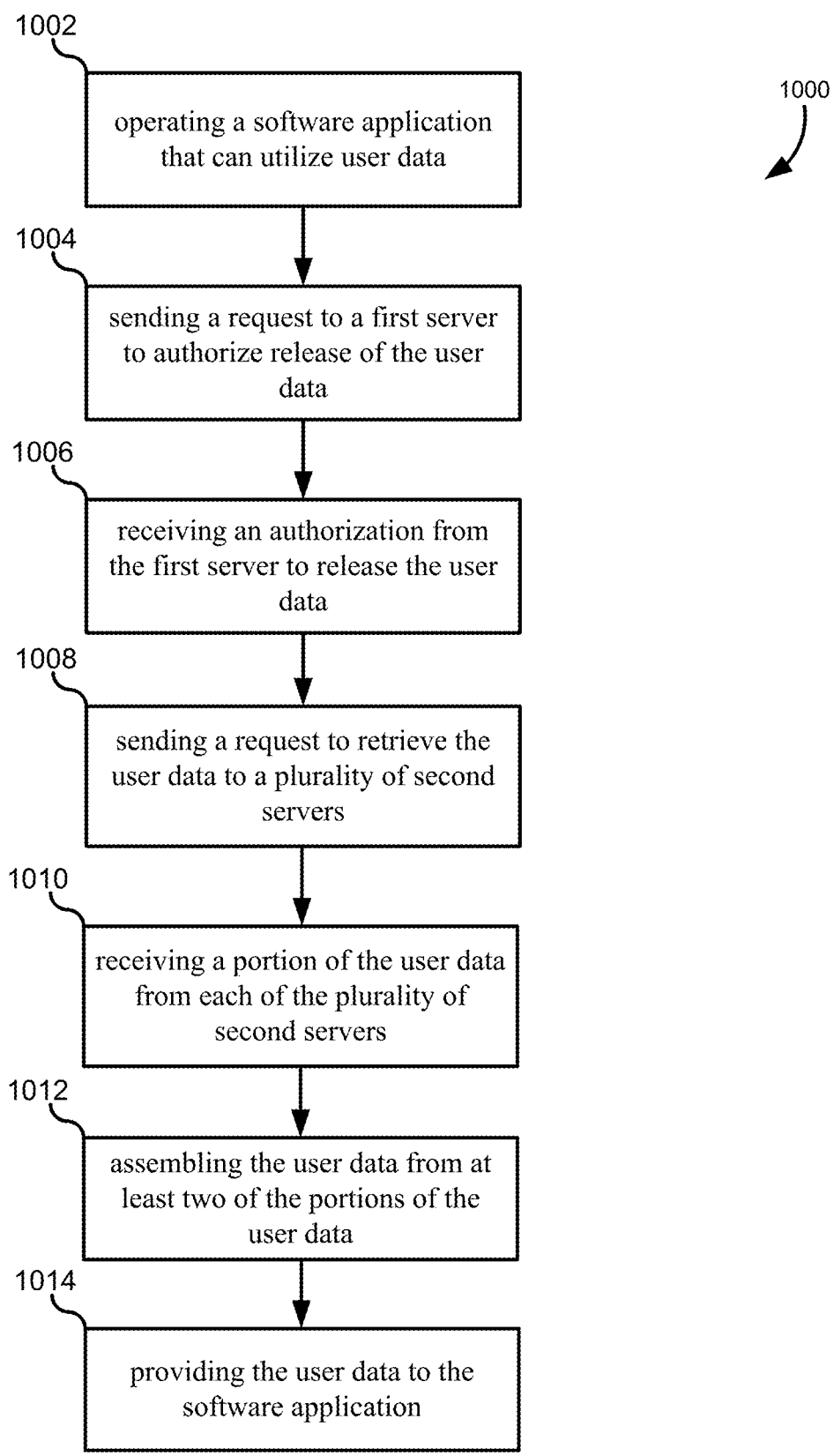
FIG. 10 illustrates a flowchart of a method for securely authorizing limited access by a software application to private user data, according to some embodiments.

FIG. 10 illustrates a flowchart of a method for securely authorizing limited access by a software application to private user data, according to some embodiments. The method may include operating a software application that can utilize user data (1002). The software application may include the service provider process described above. The software application may be run by the user device described above. The user data may include any data that is generated by a user, or generated automatically to describe user behavior. The method may also include sending a request to a first server to authorize release of the user data (1004). The first server may include the privacy manager gateway described above. The method may additionally include receiving an authorization from the first server to release the user data (1006). The authorization may include additional information that determines when and how the user data may be released. In some embodiments, the authorization may be forwarded to a plurality of second servers, which may include the independent data centers described above.

The method may also include sending a request to retrieve the user data to a plurality of second servers (1008). The request may include an identifier for the user data and/or signature information from the first server authorizing release of the user data. The method may additionally include receiving a portion of the user data from each of the plurality of second servers (1010). As described above, these portions may include data portions that were dissected, encrypted, and previously sent to the plurality of second servers. The method may further include assembling the user data from at least two of the portions of the user data (1012). Depending on the algorithm used to dissect the data in the first place, there may be a minimum threshold of data portions required (k) in order to reassemble the user data. The method may also include providing user data to the software application (1014).

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
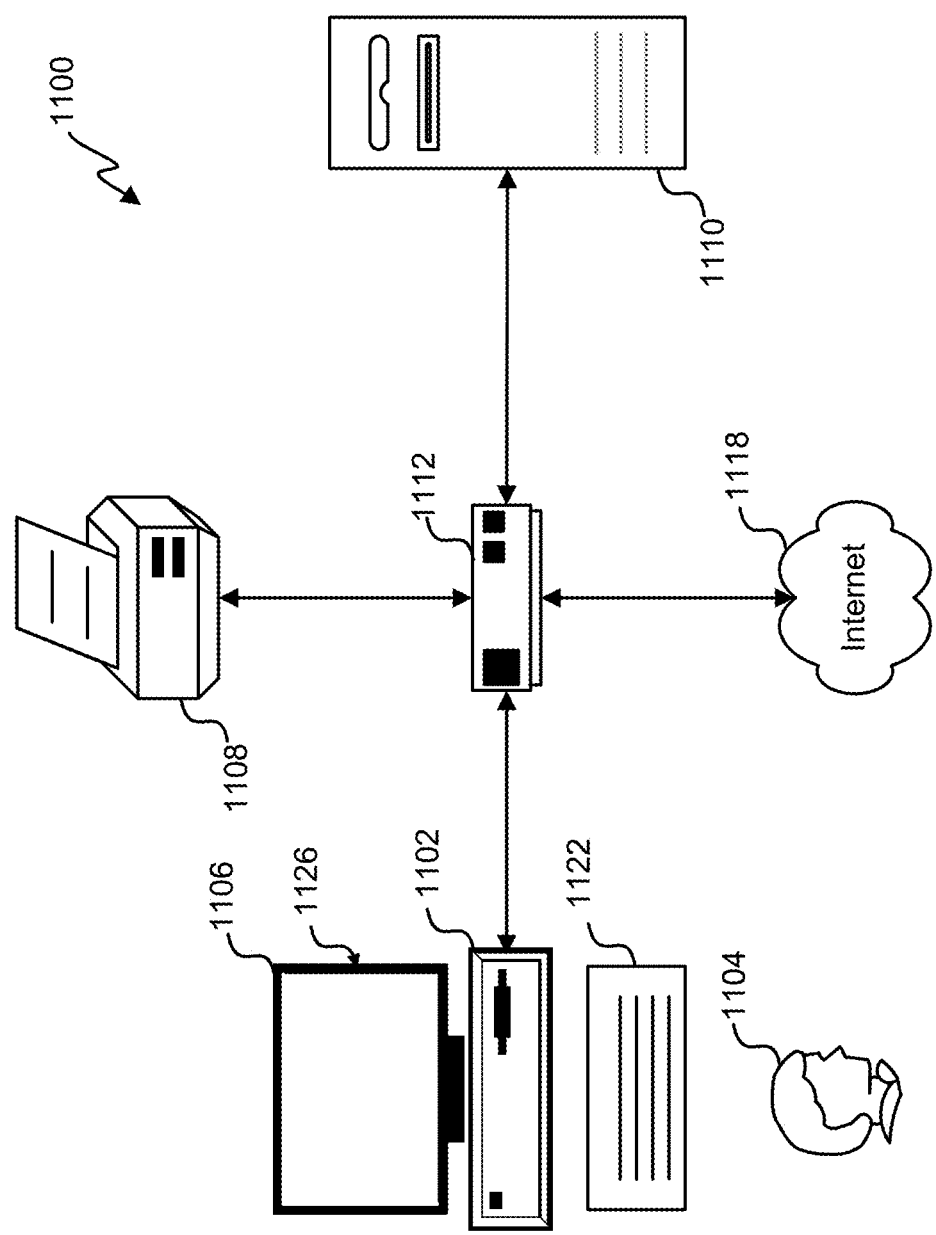
FIG. 11 illustrates an exemplary environment in which embodiments may be implemented, according to some embodiments.

FIG. 11 illustrates an exemplary environment in which embodiments may be implemented, according to some embodiments. Embodiments may be implemented in a computer system 1100 that can be used by a designer 1104 to design, for example, electronic designs. The computer system 1110 can include a computer 1102, an optional keyboard 1122, a network router 1112 or other routing fabric, an optional printer 1108, and an optional monitor 1106. The monitor 1106, processor 1102 and keyboard 1122 are part of a computer system 1126, which can be a laptop computer, desktop computer, handheld computer, rack-mounted computer, mainframe computer, etc. The monitor 1106 can be a CRT, flat screen, remote terminal, etc.

A designer 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
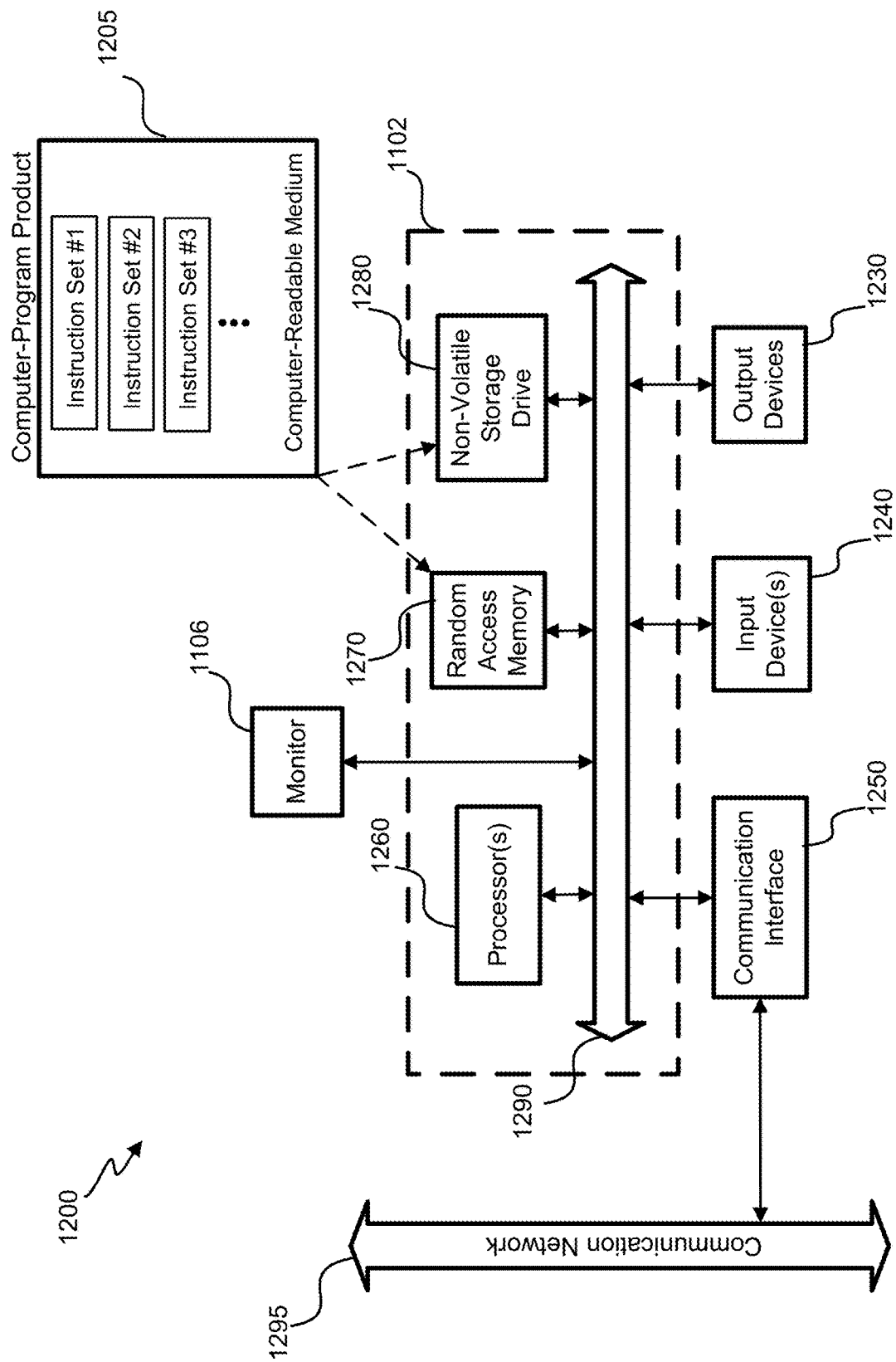
FIG. 12 illustrates an embodiment of a special-purpose host computer system, according to some embodiments.

FIG. 12 illustrates an embodiment of a special-purpose host computer system 1200, according to some embodiments. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose host computer system 1200.

Special-purpose host computer system 1200 comprises a computer 1102, a monitor 1106 coupled to computer 1102, one or more additional user output devices 1230 (optional) coupled to computer 1102, one or more user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs host computer system 1100 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM)

1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows® or the like from Microsoft® Corporation, Solaris® from Oracle®, LINUX, UNIX, and the like.

User input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1106 via a command such as a click of a button or the like. User output devices 1230 include all possible types of devices and mechanisms to output information from computer 1102. These may include a display (e.g., monitor 1106), printers, non-visual displays such as audio output devices, etc.

Communications interface 1250 provides an interface to other communication networks and devices and may serve as an interface to receive data from and transmit data to other systems, WANs and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of securely authorizing limited access by a software application to private user data, the method comprising:
    operating, by a computing device, a software application comprising a client-side component of an online service provider, wherein the software application is in communication with a server-side component of the online service provider;
    operating, by the computing device, a privacy application that is communicatively coupled to the software application, wherein the software application and the privacy application both operate on a same computing device and share a same operating system;
    determining, by the privacy application, that the online service provider requires access to data that is specific to a user of the computing device and specific to the online service provider, wherein the data is not currently available to the online service provider;
    in response to determining that the online service provider requires access to the data, sending, by a client-side component of the privacy application, a request to a first server comprising a server-side component of the privacy application to authorize release of the data that is specific to the user and specific to the online service provider, wherein the request to the first server identifies the online service provider;
    receiving, by the privacy application, first credentials from the first server to release the data that is specific to the user and specific to the online service provider;
    sending, by the privacy application, the first credentials with a request to retrieve the data that is specific to the user and specific to the online service provider to a plurality of second servers, wherein:
        each second server in the plurality of second servers is independent from the server-side component of the privacy application; and
        each second server in the plurality of second servers is independent from each of the other second servers in the plurality of second servers;
    receiving, by the privacy application, a portion of the data that is specific to the user and specific to the online service provider from each of the plurality of second servers;
    assembling, by the privacy application, the data that is specific to the user and specific to the online service provider from at least two of the portions; and
    providing, by the privacy application, the data that is specific to the user and specific to the online service provider to the software application for use by the online service provider based on a user setting that determines:
        whether the software application is allowed to access the data that is specific to the user and specific to the online service provider during a current active session; or
        whether the software application is allowed to access the data that is specific to the user and specific to the online service provider during and after a current active session.

2. The method of claim 1, further comprising:
receiving, by the privacy application, updated data that is specific to the user and specific to the online service provider from the software application;
dissecting, by the privacy application, the updated data that is specific to the user and specific to the online service provider into a plurality of data portions; and
sending, by the privacy application, a data portion from the plurality of data portions to each of the plurality of second servers.

3. The method of claim 2, further comprising:
sending, by the privacy application, a request to the first server to authorize storage of the updated data that is specific to the user and specific to the online service provider comprising a size of the updated data that is specific to the user and specific to the online service provider; and
receiving, by the privacy application, second credentials from the first server to store the updated data that is specific to the user and specific to the online service provider in the plurality of second servers.

4. The method of claim 1, wherein:
the software application comprises a search engine interface operating in a web browser on the computing device.

5. The method of claim 1, wherein:
the data that is specific to the user and specific to the online service provider comprises a search engine history.

6. The method of claim 1, wherein:
the software application comprises an email client.

7. The method of claim 1, wherein:
the data that is specific to the user and specific to the online service provider comprises a document index.

8. The method of claim 7, further comprising:
receiving, by the privacy application, an encrypted set of keys from the plurality of second servers; and
decrypting, by the privacy application, the encrypted set of keys, wherein the encrypted set of keys are encrypted using a hash of a stored password.

9. The method of claim 8, further comprising:
parsing a document to extract a set of tokens to populate the document index by identifying tokens that distinguish the document from other documents.

10. The method of claim 9, further comprising:
associating each token in the set of tokens with a document identifier;
encrypting each token in the set of tokens using the set of keys;
dissecting each encrypted token into a plurality of token portions; and
sending each token portion to a different one of the plurality of second servers.

11. The method of claim 1, wherein:
the first server comprises a gateway of a privacy management system.

12. The method of claim 1, further comprising:
displaying, by the privacy application, a user interface control comprising a plurality of privacy settings, wherein the plurality of privacy setting comprise:
 a first setting that restricts the software application from accessing the data that is specific to the user and specific to the online service provider;
 a second setting that limits the software application to accessing the data that is specific to the user and specific to the online service provider during a current active session; and
 a third setting that allows the software application to access the data that is specific to the user and specific to the online service provider.

13. The method of claim 12, wherein:
a setting selected by the user interface control is specific to the software application, and
other settings selected by the user interface control are specific to other software applications.

14. The method of claim 1, wherein:
the software application comprises a webpage operating in a web browser on the computing device;
the privacy application comprises a plug-in for the web browser;
the privacy application comprises a user interface that is displayed in the web browser that receives user input that governs how the data that is specific to the user and specific to the online service provider is provided to the webpage;
the webpage is allowed to use the data that is specific to the user and specific to the online service provider locally on the computing device, but does not transmit the data that is specific to the user and specific to the online service provider to the online service provider; and
the privacy application requires the webpage to delete the data that is specific to the user and specific to the online service provider from memory at a completion of a session.

15. A non-transitory computer-readable medium comprising instructions that, when executed by one or more processors, causes the one or more processors to perform operations comprising:
 operating, by a computing device, a software application comprising a client-side component of an online service provider, wherein the software application is in communication with a server-side component of the online service provider;
 operating, by the computing device, a privacy application that is communicatively coupled to the software application, wherein the software application and the privacy both operate on a same computing device and share a same operating system;
 determining, by the privacy application, that the online service provider requires access to data that is specific to a user of the computing device and specific to the online service provider, wherein the data is not currently available to the online service provider;
 in response to determining that the online service provider requires access to the data, sending, by a client-side component of the privacy application, a request to a first server comprising a server-side component of the privacy application to authorize release of the data that is specific to the user and specific to the online service provider, wherein the request to the first server identifies the online service provider;
 receiving, by the privacy application, first credentials from the first server to release the data that is specific to the user and specific to the online service provider;
 sending, by the privacy application, the first credentials with a request to retrieve the data that is specific to the user and specific to the online service provider to a plurality of second servers, wherein:
  each second server in the plurality of second servers is independent from the server-side component of the privacy application; and
  each second server in the plurality of second servers is independent from each of the other second servers in the plurality of second servers;
 receiving, by the privacy application, a portion of the data that is specific to the user and specific to the online service provider from each of the plurality of second servers;
 assembling, by the privacy application, the data that is specific to the user and specific to the online service provider from at least two of the portions; and
 providing, by the privacy application, the data that is specific to the user and specific to the online service provider to the software application for use by the online service provider based on a user setting that determines:
  whether the software application is allowed to access the data that is specific to the user and specific to the online service provider during a current active session; or
  whether the software application is allowed to access the data that is specific to the user and specific to the online service provider during and after a current active session.

16. The non-transitory computer-readable medium according to claim 15 comprising additional instruction that cause the one or more processors to perform additional operations comprising:
 receiving, by the privacy application, updated data that is specific to the user and specific to the online service provider from the software application;

dissecting, by the privacy application, the updated data that is specific to the user and specific to the online service provider into a plurality of data portions; and sending, by the privacy application, a data portion from the plurality of data portions to each of the plurality of second servers.

17. The non-transitory computer-readable medium according to claim 16 comprising additional instruction that cause the one or more processors to perform additional operations comprising:

sending, by the privacy application, a request to the first server to authorize storage of the updated data that is specific to the user and specific to the online service provider comprising a size of the updated data that is specific to the user and specific to the online service provider; and receiving, by the privacy application, an authorization from the first server to store the updated data that is specific to the user and specific to the online service provider in the plurality of second servers.

18. A system comprising:

one or more processors; and one or more memory devices comprising instructions that, when executed by the one or more processors, cause the one or more processors to perform operations comprising:

operating, by a computing device, a software application comprising a client-side component of an online service provider, wherein the software application is in communication with a server-side component of the online service provider;

operating, by the computing device, a privacy application that is communicatively coupled to the software application, wherein the software application and the privacy both operate on a same computing device and share a same operating system;

determining, by the privacy application, that the online service provider requires access to data that is specific to a user of the computing device and specific to the online service provider, wherein the data is not currently available to the online service provider;

in response to determining that the online service provider requires access to the data, sending, by a client-side component of the privacy application, a request to a first server comprising a server-side component of the privacy application to authorize release of the data that is specific to the user and specific to the online service provider, wherein the request to the first server identifies the online service provider;

receiving, by the privacy application, first credentials from the first server to release the data that is specific to the user and specific to the online service provider;

sending, by the privacy application, the first credentials with a request to retrieve the data that is specific to the user and specific to the online service provider to a plurality of second servers, wherein:

each second server in the plurality of second servers is independent from the server-side component of the privacy application; and each second server in the plurality of second servers is independent from each of the other second servers in the plurality of second servers;

receiving, by the privacy application, a portion of the data that is specific to the user and specific to the online service provider from each of the plurality of second servers;

assembling, by the privacy application, the data that is specific to the user and specific to the online service provider from at least two of the portions; and providing, by the privacy application, the data that is specific to the user and specific to the online service provider to the software application for use by the online service provider based on a user setting that determines:

whether the software application is allowed to access the data that is specific to the user and specific to the online service provider during a current active session; or whether the software application is allowed to access the data that is specific to the user and specific to the online service provider during and after a current active session.

19. The system of claim 18, wherein the one or more memory devices further comprise additional instructions that cause the one or more processors to perform additional operations comprising:

receiving, by the privacy application, updated data that is specific to the user and specific to the online service provider from the software application;

dissecting, by the privacy application, the updated data that is specific to the user and specific to the online service provider into a plurality of data portions; and sending, by the privacy application, a data portion from the plurality of data portions to each of the plurality of second servers.

20. The system of claim 19, wherein the one or more memory devices further comprise additional instructions that cause the one or more processors to perform additional operations comprising:

sending, by the privacy application, a request to the first server to authorize storage of the updated data that is specific to the user and specific to the online service provider comprising a size of the updated data that is specific to the user and specific to the online service provider; and receiving, by the privacy application, an authorization from the first server to store the updated data that is specific to the user and specific to the online service provider in the plurality of second servers.

* * * * *